United States Patent Office 2,783,576
Patented Mar. 5, 1957

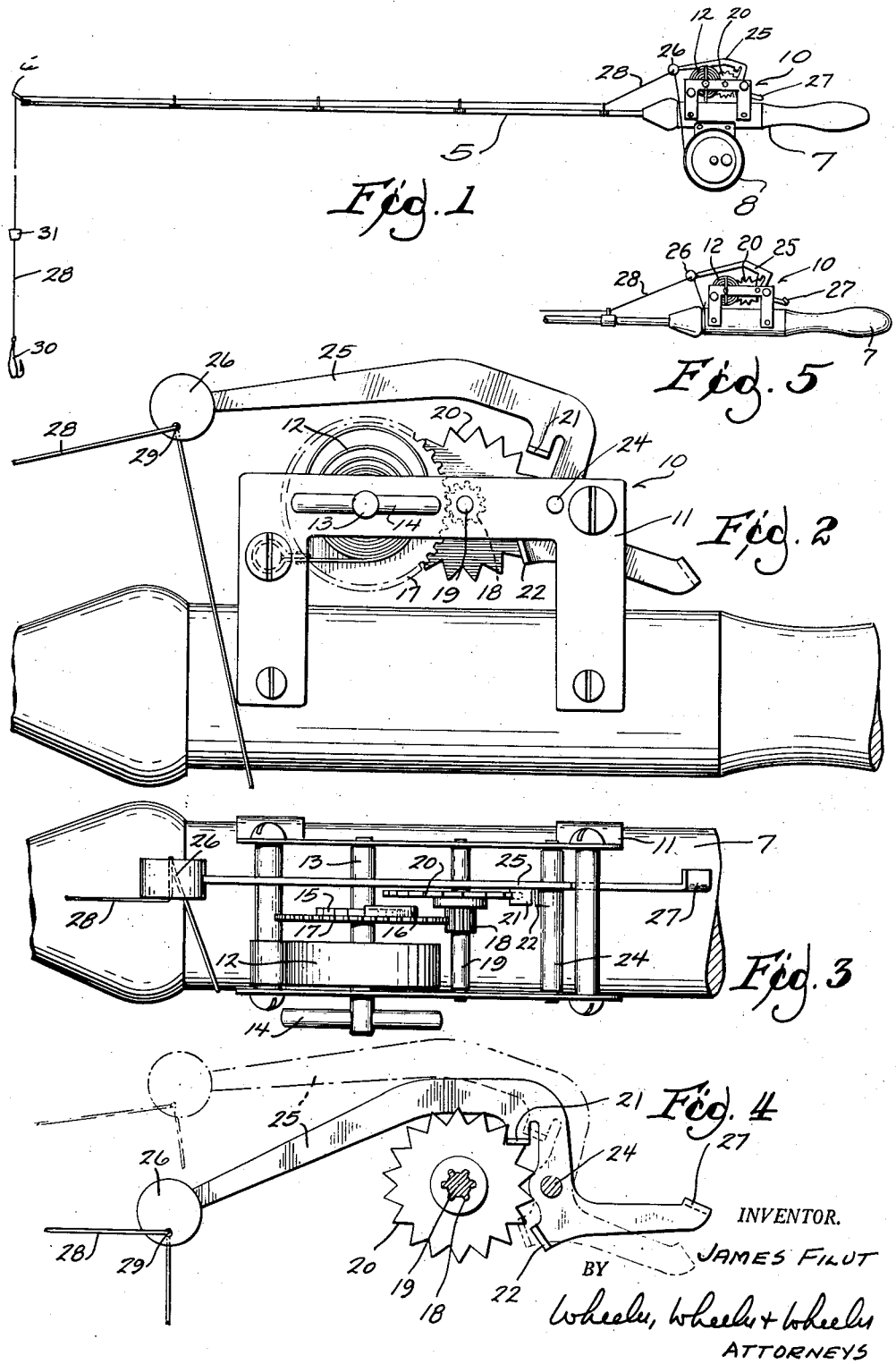

2,783,576

LINE-JIGGLING ATTACHMENT FOR FISHING RODS

James J. Filut, Milwaukee, Wis.

Application March 19, 1953, Serial No. 343,467

6 Claims. (Cl. 43—19.2)

This invention relates to a line-jiggling attachment for fishing rods.

The invention seeks to give realistic movement to the bait or lure at the end of a fish line by jiggling the line. While the invention is not limited in its application to fishing equipment used for fishing through the ice, the device has particular application to such equipment because baits used are ordinarily small and, in addition, the size of the hole cut through the ice does not ordinarily permit the type of movement of the rod or pole which would operate to cause the bait or lure to move about as it does in trolling.

In its preferred embodiment, the device herein disclosed is a clockwork mechanism using a spring motor and escapement to vibrate an arm engaged with the line, whereby the lure is moved up and down in the water, realistically simulating the movements of a wounded minnow. In the particular device herein disclosed, the vibratory lever actuated by the escapement mechanism has an aperture through which the line passes on its way to the line guide in the pole tip. However, there are various other ways in which the escapement lever and the line may be interengaged to enable the line to receive movement.

In the drawings:

Fig. 1 is a view in side elevation of a fishing rod and line equipped with the motor-driven jiggling attachment of the present invention.

Fig. 2 is an enlarged detail view in side elevation of the attachment as mounted on the handle of the rod.

Fig. 3 is a plan view of the attachment.

Fig. 4 is a detail view in side elevation of the escapement mechanism driven by the motor.

Fig. 5 is a fragmentary view showing a modified embodiment of the invention.

The rod 5 may be of any desired type. At its end, it has the usual line guide at 6 and additional guides may be provided at intervals in the usual manner if desired. On the handle 7, I mount not only the usual reel 8 but the attachment directly designated by reference character 10, with which the invention is particularly concerned. The reel 8, incidentally, is not essential to the use of the attachment, inasmuch as the inner end of the line may be fixed to the handle or carried in any other suitable way, as suggested in Fig. 5.

In the simple form of the preferred embodiment illustrated, the attachment comprises a clock-work motor including a frame 11 to which one end of the clock spring 12 is fixed. The winding shaft 13 is provided with a manually operable key at 14 and carries a ratchet wheel 15 engaged by pawl 16 mounted on the driving gear 17. This permits the winding rotation of shaft 13 in a direction to tension spring 12 but enables the unwinding rotation of shaft 13 to be communicated to gear 17 in the usual way.

When the gear 17 rotates, its motion is communicated to the gear 18 on the escapement spindle 19. This spindle carries escapement wheel 20 having teeth with which the lugs 21 and 22 of escapement lever 25 are alternately engaged as the lever oscillates on its pintle 24.

Lever 25 desirably, although not necessarily, has a weighted end at 26 and it may be provided at its opposite end with a thumbpiece 27 which the operator may conveniently press with his thumb to hold the lever against movement.

In the particular device shown, the engagement of the lever with the fish line 28 is effected by the provision of a small opening 29 in the weight 26 through which the line passes from its anchorage at the handle end of the rod to the guide 6 through which the line extends to the lure 30 where, in the illustrated arrangement, is a small spoon hook. A bobber 31 may be used if desired, as it does not interfere with the realistic movement imparted to the lure in the use of the device.

No great amount of power is required. The device will, therefore, operate over a substantial period of time wtih one winding of the spring motor. Moreover, when a fish takes the lure, the tension on the line will arrest the operation of the spring motor by holding lever 25 against oscillatory movement. Since the escapement mechanism illustrated makes a definite and easily detectable sound, the sudden stoppage of its operation within the period for which it would ordinarily continue, serves notice upon the operator that he has hooked a fish.

I claim:

1. An attachment for a fishing rod having a line guide, a line, a lure at the free end of the line and means remote from the line guide for anchoring one end of the line to the rod, said attachment comprising the combination with a motor, of a jiggling device connected with the motor to be driven therefrom, said device having an eye through which the line may be threaded between its anchored end and the line guide whereby the operation of said motor will jiggle the line, said jiggling device further comprising a pivoted lever having escapement pawls, said motor having a toothed escapement wheel with which said pawls are alternately engageable in the oscillation of said lever.

2. The device of claim 1 in which said lever has a portion provided with a weighted head provided with said eye, the inertia of the head contributing to the periodic oscillation of the lever.

3. For use with a fishing rod having a handle and a terminal line guide and means adjacent the handle for anchoring one end of the line threaded through the line guide, an attachment having a frame, said frame having means for mounting said attachment upon the rod at the handle, and a spring motor means carried by the frame and including a driven escapement lever having a free end provided with a line guide disposed to receive a portion of the line between the anchoring means provided on the rod and the terminal line guide provided on the rod.

4. In a fishing apparatus including a fishing rod, the improvement for causing sustained jiggling of a line to agitate a lure tethered to said line and comprising a vibratory member mounted on said fishing rod, a coupling between said member and line, and a jiggling motor including means for storing and releasing energy and having a part in motion transmitting connection to the vibratory member, said motor constituting means for actuating said vibratory member for sustained agitation of the lure to attract fish to the lure.

5. In fishing apparatus including a fishing rod, the improvement for causing sustained jiggling of a line to agitate a lure tethered to said line and comprising a holder mounted on said rod, a vibratory member mounted on said holder, a coupling between said member and line, and a jiggling motor including means for storing and releasing energy and mounted on the holder and having a power operated rigid part in motion transmitting connection with the vibratory member, said motor constituting means for actuating said vibratory member independently of any action of the fish for sustained agitation of the lure to attract fish to the lure.

6. The device of claim 5 in which the rod is provided with a line guide and has means to which the line is relatively fixed at a point remote from such guide, the motor-driven vibratory member aforesaid being mounted on the rod remote from said guide, said coupling comprising a supplemental guide on said member through which the line passes between the line guide and the point where the line is fixed.

References Cited in the file of this patent

UNITED STATES PATENTS

| | | |
|---|---|---|
| 522,352 | Poppowitsch | July 3, 1894 |
| 827,972 | Grignon | Aug. 7, 1906 |
| 876,732 | Schmidt | Jan. 14, 1908 |
| 885,627 | Loehr | Apr. 21, 1908 |
| 2,483,071 | Stine | Sept. 27, 1949 |
| 2,643,478 | Paulsen | June 30, 1953 |
| 2,706,358 | Abel | Apr. 19, 1955 |